United States Patent
Jin et al.

(10) Patent No.: US 8,261,922 B2
(45) Date of Patent: Sep. 11, 2012

(54) ASSEMBLED DUSTBIN

(75) Inventors: Jiaming Jin, Zhejiang (CN); Xiaofeng Lu, Zhejiang (CN); Zhongjun Zhou, Zhejiang (CN)

(73) Assignee: Zhejiang Jiaxing Zhongda Group Co., Ltd., Baibu Town, Haiyan, Zhengjiang Province (CN)

( * ) Notice: Subject to any disclaimer, the term of this patent is extended or adjusted under 35 U.S.C. 154(b) by 186 days.

(21) Appl. No.: 12/791,804

(22) Filed: Jun. 1, 2010

(65) Prior Publication Data

US 2011/0139790 A1 Jun. 16, 2011

(30) Foreign Application Priority Data

Dec. 10, 2009 (CN) .................. 2009 2 0291682 U

(51) Int. Cl.
*B65D 8/14* (2006.01)
(52) U.S. Cl. .................. 220/4.28; 220/4.31; 220/646
(58) Field of Classification Search .................. 206/453, 206/586; 220/4.28, 4.31, 4.33, 652, 646, 220/651

See application file for complete search history.

(56) References Cited

U.S. PATENT DOCUMENTS

| | | | | |
|---|---|---|---|---|
| 3,266,656 A * | 8/1966 | Kridle | .......... | 220/4.28 |
| 4,002,261 A * | 1/1977 | Litchfield | ...... | 220/683 |
| 4,161,853 A * | 7/1979 | Weiss et al. | ..... | 52/288.1 |
| 5,474,196 A * | 12/1995 | Fausel et al. | ..... | 220/4.28 |
| 5,560,508 A * | 10/1996 | Hsu | ..... | 220/4.31 |
| 5,638,973 A * | 6/1997 | Dewey et al. | ..... | 220/4.33 |
| 5,678,717 A * | 10/1997 | Hsu | ..... | 220/4.28 |
| 5,765,707 A * | 6/1998 | Kenevan | ..... | 220/4.28 |
| 5,967,356 A * | 10/1999 | Laarhoven et al. | ..... | 220/6 |
| 7,347,328 B2 * | 3/2008 | Hartwall | ..... | 206/600 |
| 7,395,956 B1 * | 7/2008 | Bell et al. | ..... | 232/2 |
| 2002/0040903 A1 * | 4/2002 | Coones | ..... | 220/4.33 |
| 2009/0218341 A1 * | 9/2009 | Wu | ..... | 220/4.28 |

* cited by examiner

*Primary Examiner* — David Fidei

(74) *Attorney, Agent, or Firm* — Global IP Services; Tianhua Gu

(57) ABSTRACT

A dustbin relates to a composite dustbin that can be easily assembled by and disassembled into parts. It is also characterized by pretty appearance, small coverage of warehouse area, low transport fee and good market prospects.

2 Claims, 5 Drawing Sheets

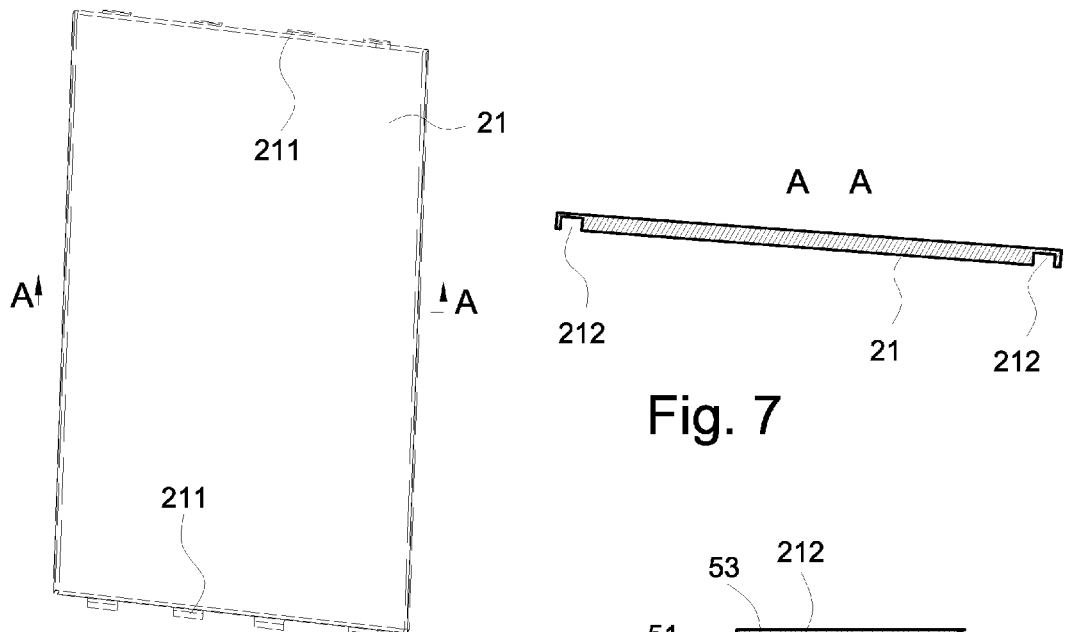
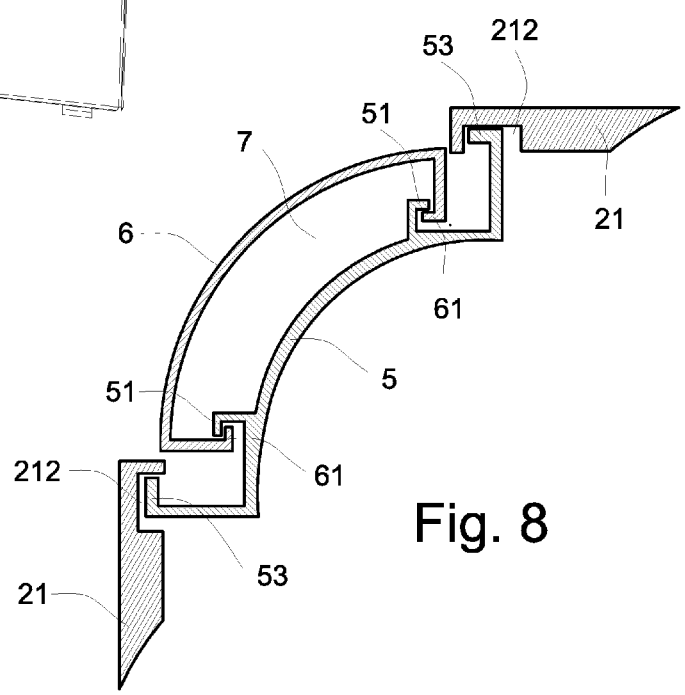

US 8,261,922 B2

ASSEMBLED DUSTBIN

CROSS REFERENCE TO THE RELATED PATENT APPLICATIONS

This patent application claims the priority of the Chinese patent application No. 200920218031.9 filed on Oct. 23, 2009, which application is incorporated herein by reference.

BACKGROUND OF THE INVENTION

1. Field of the Invention

The present invention relates to dustbin. More particularly, the present invention relates to an assembled dustbin.

2. Related Prior Art

Most dustbins in prior arts are integral, inconvenient for carrying and transport. They also cause expensive cost of transportation.

SUMMARY OF THE INVENTION

An assembled dustbin, comprising:
a baseplate (1), body (2) and a dead ring (3);
The body (2) comprises four pillars (22) and four side plates (21). Each pillar (22) comprises inner pillar (5) and outer pillar (6). The four pillars (22) and four side plates (21) form the body (2). The lower ends of pillars (22) and side plates (21) are coupled with the baseplate (1), and the upper ends of pillars (22) and side plates (21) are coupled with the dead ring (3).

The inner pillar (5) is provided with snap-fit (51) and the outer pillar (6) is provided with snap-fit (61). The snap-fit (51) and snap-fit (61) are engaged each other to couple the inner pillar (5) with the outer pillar (6) to form a cavity (7).

The baseplate (1) is integrally provided with a protruding boss (17) that has a snap-fit (171). The dead ring (3) is provided with a protruding boss (37) that has a snap-fit (371). Both ends of each inner pillar (5) are provided with notches (52). The engagement of each inner pillar (5) and each outer pillar (6) forms a cavity (7). The lower end of cavity (7) sheathes the boss (17) provided with the baseplate (1) and the snap-fit (171) of boss (17) engages with the notch (52) to secure the inner pillar (5) and the baseplate (1). The upper end of cavity (7) sheathes the boss (37) provided with the dead ring (3) and the snap-fit (371) of boss (37) engages with the notch (52) to secure the inner pillar (5) and the dead ring (3).

The said side plate (21) is provided with a notch (212). The inner pillar (5) is provided with a snap hook (53) to couple the notch (212).

The baseplate (1) is provided with notches (13) and the dead ring is provided with notches (33). The side plate (21) is provided with snap-fits (211). The snap-fits (211) engage with the notches (13) of baseplate (1) and the notches (33) of dead ring (3) to secure the side plate (21) in between of the baseplate (1) and the dead ring (3).

Keeping in mind the above problems occurring in the related art, the present invention provides an assembled dustbin that can be easily assembled and disassembled. It is also characterized by pretty appearance, small coverage of warehouse area, low transport fee and good market prospects.

BRIEF DESCRIPTION OF THE DRAWINGS

FIG. 6 is a schematic view of side plate;
FIG. 7 is a sectional view along the A-A line of FIG. 6;
FIG. 8 is a schematic view of the engagement of pillars and side plates.

DESCRIPTION OF THE PREFERRED EMBODIMENTS

Figure 1:
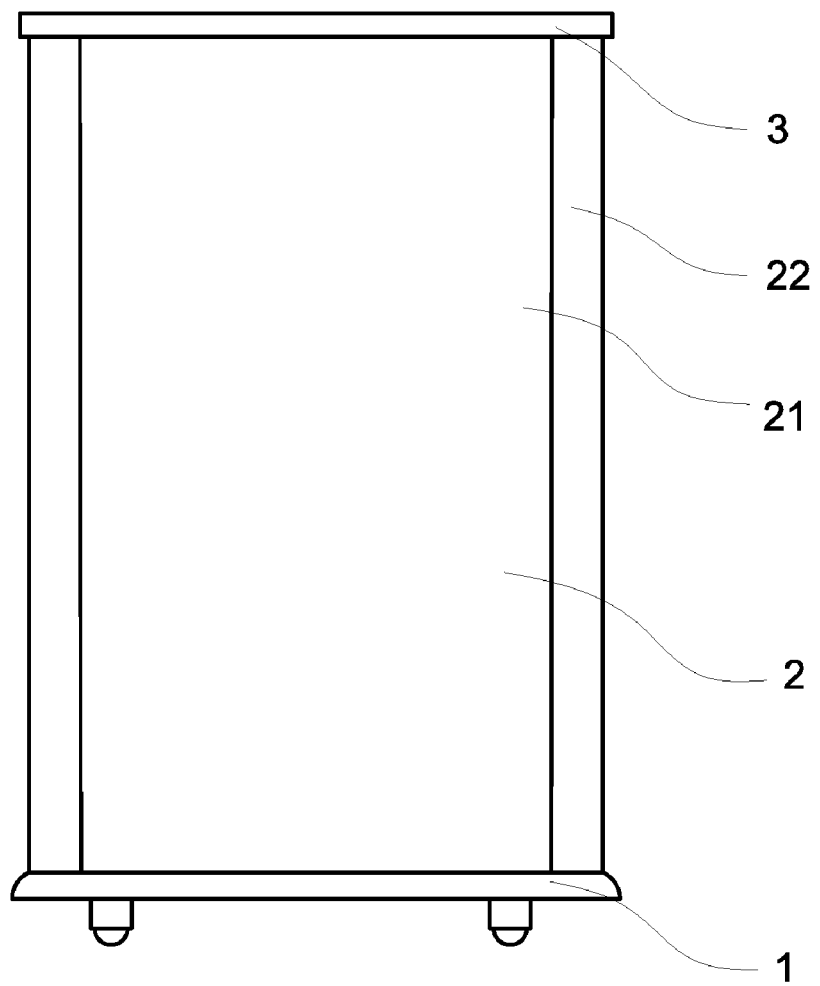
FIG. 1 is a schematic view of assembled structure of the present invention.
Figure 2:
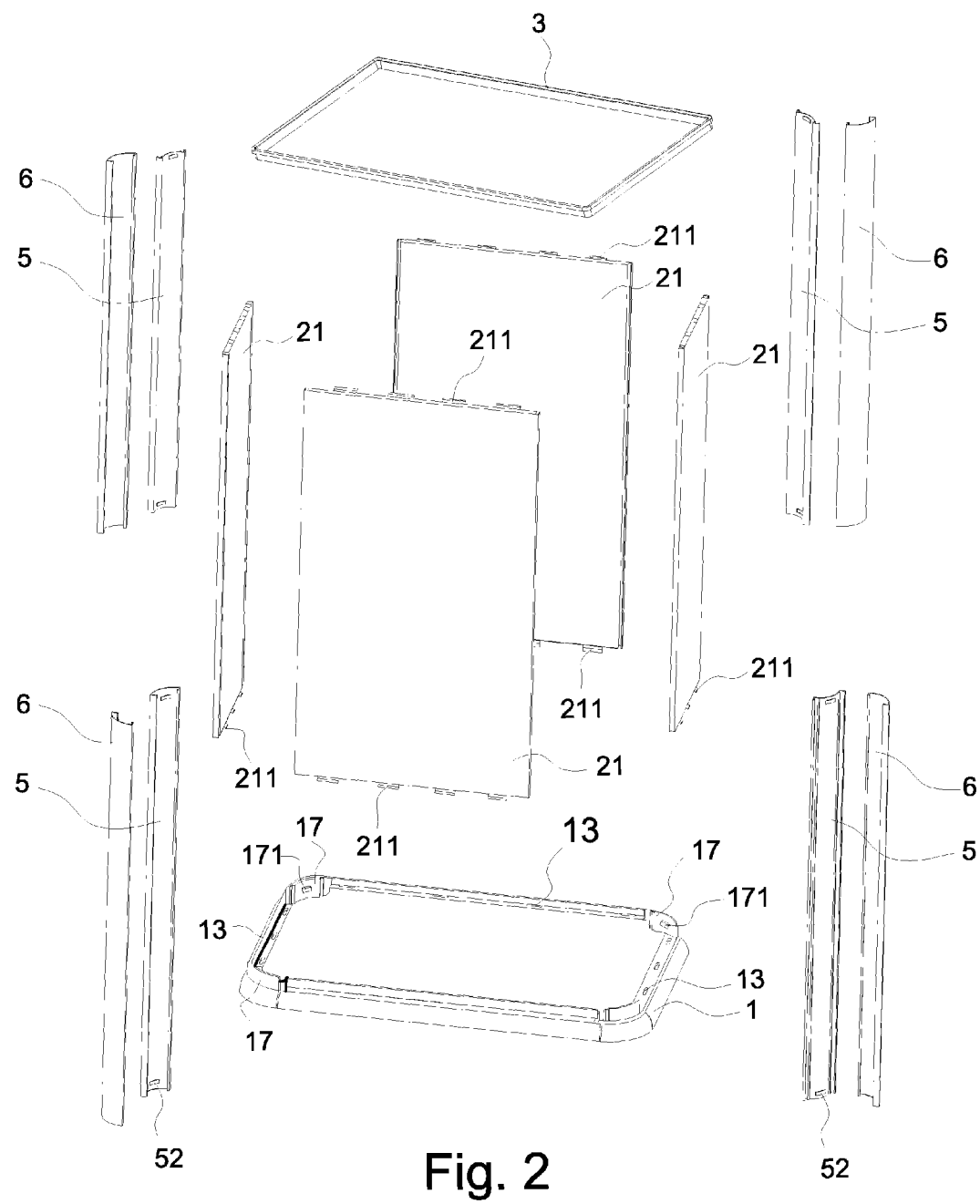
FIG. 2 is the exploded view of FIG. 1.
Figure 3:
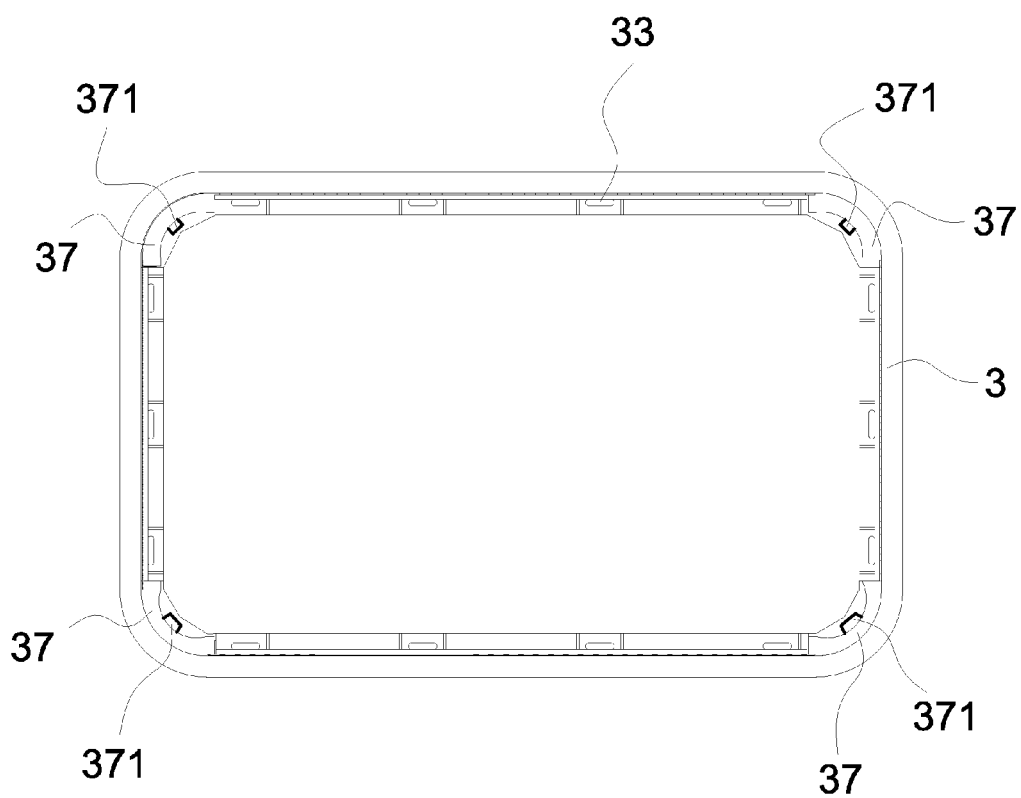
FIG. 3 is a schematic view of dead ring.
Figures 4, 5:
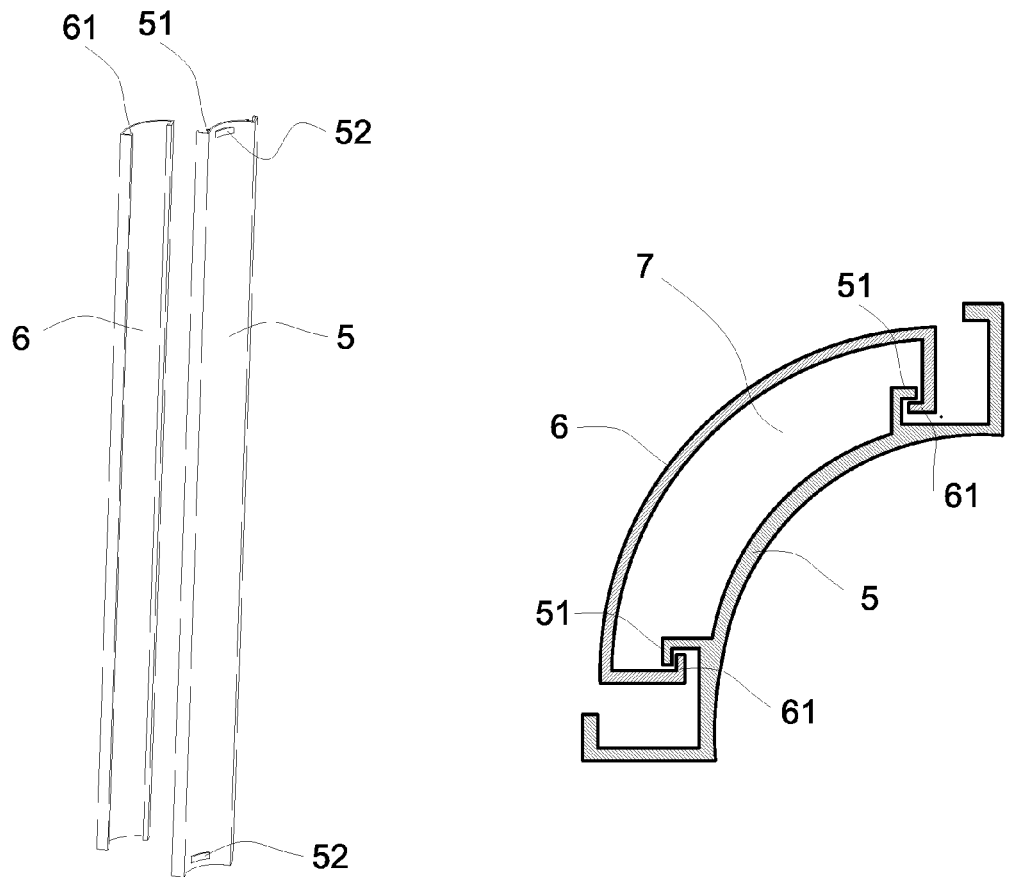
FIG. 4 is a schematic view of pillars.
FIG. 5 is a schematic view of the engagement of inner pillar and outer pillar.

The preferred embodiment of the present invention will now be described with reference to FIGS. 1-8 of the drawings. Identical elements in the various figures are identified with the same reference numerals.

Embodiment 1

An assembled dustbin, comprising:
a baseplate (1), body (2) and a dead ring (3);
The body (2) comprises four pillars (22) and four side plates (21). Each pillar (22) comprises inner pillar (5) and outer pillar (6). The four pillars (22) and four side plates (21) form the body (2). The lower ends of pillars (22) and side plates (21) are coupled with the baseplate (1), and the upper ends of pillars (22) and side plates (21) are coupled with the dead ring (3).

The inner pillar (5) is provided with snap-fit (51) and the outer pillar (6) is provided with snap-fit (61). The snap-fit (51) and snap-fit (61) are engaged each other to couple the inner pillar (5) with the outer pillar (6) to form a cavity (7).

The baseplate (1) is integrally provided with a protruding boss (17) that has a snap-fit (171). The dead ring (3) is provided with a protruding boss (37) that has a snap-fit (371). Both ends of each inner pillar (5) are provided with notches (52). The engagement of each inner pillar (5) and each outer pillar (6) forms a cavity (7). The lower end of cavity (7) sheathes the boss (17) provided with the baseplate (1) and the snap-fit (171) of boss (17) engages with the notch (52) to secure the inner pillar (5) and the baseplate (1). The upper end of cavity (7) sheathes the boss (37) provided with the dead ring (3) and the snap-fit (371) of boss (37) engages with the notch (52) to secure the inner pillar (5) and the dead ring (3).

The said side plate (21) is provided with a notch (212). The inner pillar (5) is provided with a snap hook (53) to couple the notch (212).

The baseplate (1) is provided with notches (13) and the dead ring is provided with notches (33). The side plate (21) is provided with snap-fits (211). The snap-fits (211) engage with the notches (13) of baseplate (1) and the notches (33) of dead ring (3) to secure the side plate (21) in between of the baseplate (1) and the dead ring (3).

Keeping in mind the above problems occurring in the related art, the present invention provides an assembled dustbin that can be easily assembled and disassembled. It is also characterized by pretty appearance, small coverage of warehouse area, low transport fee and good market prospects.

What is claimed is:
1. An assembled dustbin comprising:
a baseplate (1), body (2) and a upper frame (3), wherein the body (2) comprises four pillars (22) and four side plates (21), each pillar (22) comprises an inner pillar (5) and an outer pillar (6), the four pillars (22) and four side plates (21) form the body (2), lower ends of the four pillars (22) and four side plates (21) are coupled with the baseplate (1), and the upper ends of four pillars (22) and four side plates (21) are coupled with the upper frame (3);

each inner pillar (5) is provided with a snap-fit (51) and each outer pillar (6) is provided with a snap-fit (61), the snap-fit (51) of inner pillar and snap-fit (61) of outer pillar are engaged together to couple the inner pillar (5) with the outer pillar (6) to form a cavity (7);

the baseplate (1) is integrally provided with a protruding boss (17) that has an horizontally protruded snap-fit (171), the upper frame (3) is provided with a protruding boss (37) that has an horizontally protruded snap-fit (371), both ends of each inner pillar (5) are provided with notches (52), a lower end of cavity (7) sheathes the boss (17) provided on the baseplate (1) and the horizontally protruded snap-fit (171) of boss (17) engages with the notch (52) to secure the inner pillar (5) and the baseplate (1), the upper end of cavity (7) sheathes the boss (37) provided on the upper frame (3) and the horizontally protruded snap-fit (371) of boss (37) engages with the notch (52) to secure the inner pillar (5) and the upper frame (3);

the side plate (21) is provided with a notch (212), the inner pillar (5) is provided with a snap hook (53) to couple the notch (212);

the baseplate (1) is provided with notches (13) and the upper frame ring is provided with notches (33) the side plate (21) is provided with snap-fits (211), the snap-fits (211) engage with the notches (13) of baseplate (1) and the notches (33) of upper frame ring (3) to secure the side plate (21) between the baseplate (1) and the upper frame ring (3).

2. The assembled dustbin of claim 1, wherein the horizontally protruded snap-fits (171) are inserted into the notches (52), the snap-fits (51) are connected with the snap-fits (61) and the cavity (7) is sheathed the boss (37) that makes a firm connection between the pillars (22) with the baseplate (1) and upper frame (3); the snap-fits (211) are inserted into the notches (13), and the snap hooks (53) are inserted into the notches (212) that make firm connection between the side plates with the pillars (22), upper frame (3) and baseplate (1);

therefore, the assembled dustbin becomes a firm one.

* * * * *